US010732896B2

(12) United States Patent
Inbar et al.

(10) Patent No.: US 10,732,896 B2
(45) Date of Patent: Aug. 4, 2020

(54) METHOD AND SYSTEM FOR READING DATA DURING CONTROL SYNC OPERATIONS

(71) Applicant: Western Digital Technologies, Inc., San Jose, CA (US)

(72) Inventors: Karin Inbar, Ramat Hasharon (IL); Michael Micha Ionin, Rehovot (IL); Einat Lev, Rehovot (IL)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 173 days.

(21) Appl. No.: 15/949,036

(22) Filed: Apr. 9, 2018

(65) Prior Publication Data

US 2018/0357010 A1 Dec. 13, 2018

Related U.S. Application Data

(60) Provisional application No. 62/518,255, filed on Jun. 12, 2017.

(51) Int. Cl.
*G06F 3/06* (2006.01)
*G06F 12/10* (2016.01)
*G06F 12/02* (2006.01)

(52) U.S. Cl.
CPC ............ *G06F 3/0659* (2013.01); *G06F 3/065* (2013.01); *G06F 3/0611* (2013.01);
(Continued)

(58) Field of Classification Search
CPC ...... G06F 3/0611; G06F 3/0619; G06F 3/065; G06F 3/0659; G06F 3/0679;
(Continued)

(56) References Cited

U.S. PATENT DOCUMENTS

| 7,386,655 B2 * | 6/2008 | Gorobets | G06F 12/0246 711/103 |
| 2012/0239869 A1 * | 9/2012 | Chiueh | G06F 12/0246 711/103 |

(Continued)

OTHER PUBLICATIONS

Aayush Gupta, Youngjae Kim, and Bhuvan Urgaonkar. 2009. DFTL: a flash translation layer employing demand-based selective caching of page-level address mappings. SIGARCH Comput. Archit. News 37, 1 (Mar. 2009), 229-240. (Year: 2009).*

*Primary Examiner* — Reginald G Bragdon
*Assistant Examiner* — Aaron D Ho
(74) *Attorney, Agent, or Firm* — Patterson & Sheridan, LLP; Steven H. Versteeg (57) ABSTRACT

A method and apparatus for optimizing read operations during a control sync operation on a data storage device are disclosed. The data storage device contains a management table used for mapping memory addresses to a non-volatile memory. A control sync operation makes a copy of the management table to the non-volatile memory. The control sync operation is non-blocking—the sync operation allows read and write operations in parallel with making a copy of or updating the management table. During the control sync operation, the read operations are optimized through a CUQ and an overlap range table. The CUQ may act as a temporary management table while also containing updates to be consolidated to the management table. The overlap range table is used to allow skipping searches within the CUQ by identifying then mapping entries that reside within CUQ.

31 Claims, 6 Drawing Sheets

(52) U.S. Cl.
CPC .......... *G06F 3/0619* (2013.01); *G06F 3/0679* (2013.01); *G06F 12/0246* (2013.01); *G06F 12/10* (2013.01); *G06F 2212/1016* (2013.01); *G06F 2212/1024* (2013.01); *G06F 2212/657* (2013.01); *G06F 2212/7201* (2013.01)

(58) Field of Classification Search
CPC .... G06F 12/0246; G06F 12/10; G06F 12/109; G06F 12/1045; G06F 12/121; G06F 12/123; G06F 2212/1016; G06F 2212/1024; G06F 2212/657; G06F 2212/7201
USPC ........................................................ 711/103
See application file for complete search history.

(56) References Cited

U.S. PATENT DOCUMENTS

| | | | |
|---|---|---|---|
| 2012/0317377 A1* | 12/2012 | Palay | G06F 12/0246 |
| | | | 711/154 |
| 2013/0124794 A1* | 5/2013 | Bux | G06F 12/0246 |
| | | | 711/103 |
| 2014/0059279 A1* | 2/2014 | He | G06F 12/0246 |
| | | | 711/103 |
| 2016/0299710 A1* | 10/2016 | Chang | G06F 12/0246 |
| 2017/0249257 A1* | 8/2017 | Bonnet | G06F 12/0804 |
| 2018/0239532 A1 | 8/2018 | Inbar et al. | |

* cited by examiner

METHOD AND SYSTEM FOR READING DATA DURING CONTROL SYNC OPERATIONS

CROSS-REFERENCE TO RELATED APPLICATIONS

This application claims benefit of U.S. Provisional Patent Application Ser. No. 62/518,255, filed Jun. 12, 2017, which is herein incorporated by reference.

BACKGROUND OF THE DISCLOSURE

Field of the Disclosure

Implementations of the present disclosure generally relate to data storage devices.

Description of the Related Art

Data storage devices enable users to store and retrieve data. Examples of data storage devices include volatile memory devices and non-volatile memory devices. A non-volatile memory device retains data after a power-down event, and a volatile memory device loses data after a power-down event.

A data storage device may maintain control information associated with stored data. Control information may be a management table for mapping logical addresses to physical addresses in the non-volatile memory. When mapping tables are written to the non-volatile memory in a process that can be called a control-sync, further updates to the tables might be forbidden in order to prevent new updates from being stored into the non-volatile memory prematurely. Therefore, some systems do not process new writes/read requests during a control-sync phase. A system that allows a new write/read request to be processed during control-sync may choose to temporarily store new updates to the mapping tables during control-sync within a control update queue (CUQ) that serves as an extension to the other mapping tables. When using a CUQ during a control-sync, when a read request arrives, such a system would need to scan the CUQ and look for the most recent update first. Such a scan can be inefficient and negatively impact device performance.

Thus, an efficient means to perform a read operation while CUQ is not empty is needed.

SUMMARY OF THE DISCLOSURE

A method and apparatus for optimizing read operations during a control sync operation on a data storage device are disclosed. The data storage device contains a management table used for mapping memory addresses to a non-volatile memory. A control sync operation makes a copy of the management table to the non-volatile memory. The control sync operation is non-blocking—the sync operation allows read and write operations in parallel with making a copy of or updating the management table. During the control sync operation, the read operations are optimized through a CUQ and an overlap range table. The CUQ may act as a temporary management table while also containing updates to be consolidated to the management table. The overlap range table optimizes searches of the CUQ by identifying recently accessed addresses.

In one implementation, a method, in a controller including a flash translation layer (FTL) and one or more management tables coupled to a non-volatile memory, comprises: maintaining a CUQ and an overlap range table comprising recent access information to the non-volatile memory; receiving a read request during an update of the one or more management tables in non-volatile memory; and reading data from the non-volatile memory using the overlap range table and the CUQ during the update of the one or more management tables.

In another implementation, a system comprises a non-volatile memory including an FTL and one or more management tables; and at least one processor coupled to a volatile memory configured to: maintain an overlap range table comprising recent access information to the non-volatile memory and a CUQ; receive a read request during an update of the one or more management tables to the non-volatile memory; and read data from the non-volatile memory using the overlap range table and the CUQ during the update of the one or management tables by the FTL.

In another implementation, a non-transitory computer-readable medium is disclosed that includes instructions, that, when executed by a processing unit of a system with a controller including a FTL and one or more management tables coupled to a non-volatile memory, cause the system to efficiently perform reads during an update to the management table by performing the steps of: maintain an overlap range table comprising recent access information to the non-volatile memory and a CUQ; receive a read request by the FTL during an update of the one or more management tables during a non-blocking control sync; and read data from the non-volatile memory using a CUQ during the update of the one or management tables during the non-blocking control sync.

In another implementation, a device is disclosed that comprises: a non-volatile memory device; means for mapping physical addresses coupled to a non-volatile memory; means to receive a read request during an update of the means for mapping physical addresses during a non-blocking control sync; and means to read data from the non-volatile memory using a temporary means for mapping physical addresses during the update of the means for mapping physical addresses during the non-blocking control sync.

Implementations of the systems, methods, and instructions optimize read latency during control sync operations because they employ a proxy management table, such as the CUQ. The overlap range table avoids prolonged searches of the proxy management table, directing read operations to the regular management table when necessary. Implementations ensure the most accurate flash translation layer mapping is used by properly managing new mappings on the non-volatile memory with control updates.

BRIEF DESCRIPTION OF THE DRAWINGS

So that the manner in which the above-recited features of the present disclosure can be understood in detail, a more particular description of the disclosure, briefly summarized above, may be had by reference to implementations, some of which are illustrated in the appended drawings. It is to be noted, however, that the appended drawings illustrate only typical implementations of this disclosure and are therefore not to be considered limiting of its scope, for the disclosure may admit to other equally effective implementations.

Identical reference numerals have been used, where possible, to designate identical elements that are common to the figures. It is contemplated that elements disclosed in one implementation may be beneficially utilized in other implementations without specific recitation.

DETAILED DESCRIPTION

In the following, reference is made to implementations of the disclosure. However, it should be understood that the disclosure is not limited to the described implementations. Instead, any combination of the following features and elements, whether related to different implementations or not, is contemplated to implement and practice the disclosure. Furthermore, although implementations of the disclosure may achieve advantages over other possible solutions and over the prior art, whether or not a particular advantage is achieved by a given implementation is not limiting of the disclosure. Thus, the following aspects, features, implementations and advantages are merely illustrative and are not considered elements or limitations of the appended claims except where explicitly recited in a claim(s). Likewise, a reference to "the disclosure" shall not be construed as a generalization of any inventive subject matter disclosed herein and shall not be considered to be an element or limitation of the appended claims except where explicitly recited in a claim(s).

A method and apparatus for optimizing read operations during a control sync operation on a data storage device are disclosed. The data storage device contains a management table used for mapping memory addresses to a non-volatile memory. A control sync operation makes a copy of the management table to the non-volatile memory. The control sync operation is non-blocking—the sync operation allows read and write operations in parallel with making a copy of or updating the management table. During the control sync operation, the read operations are optimized through a CUQ and an overlap range table. The CUQ may act as a temporary management table while also containing updates to be consolidated to the management table. The overlap range table optimizes searches of the CUQ by identifying recently accessed addresses.

In the description, common or similar features may be designated by common reference numbers. As used herein, "exemplary" may indicate an example, an implementation, and/or an aspect, and should not be construed as limiting or as indicating a preference or a preferred implementation.

Figure 1:
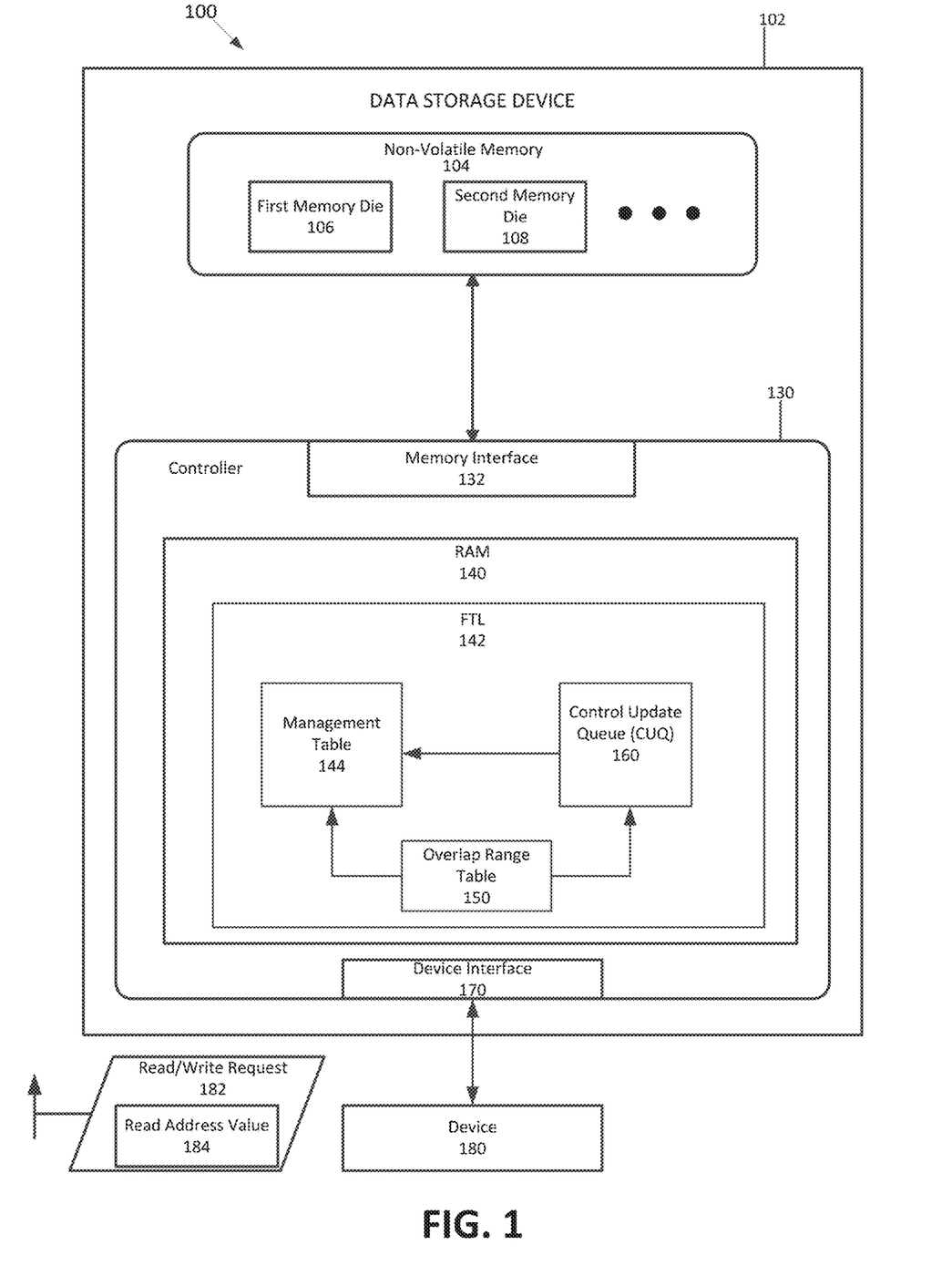
FIG. 1 illustrates a system including a data storage device configured to perform read operations during a non-blocking control sync operation according to one implementation described herein.

FIG. 1 illustrates a system 100 including a data storage device configured to perform read operations during a non-blocking control sync operation according to one implementation described herein. The system 100 includes the data storage device 102 that is communicatively coupled to a device 180, such as a host device or an access device. In at least one implementation, the data storage device 102 includes a non-volatile memory 104 and a controller 130. The controller 130 is communicatively coupled to the non-volatile memory 104 via a memory interface 132.

The non-volatile memory 104 includes at least one memory die, such as a first memory die 106 and a second memory die 108. The first memory die 106 contains a non-volatile array of storage elements. The non-volatile memory 104 may include a flash memory or a resistive memory. The non-volatile memory 104 may have a planar or a three-dimensional memory configuration.

The controller 130 includes a device interface 170 that is communicatively coupled to the device 180. The controller 130 includes a random access memory 140. In at least one implementation, the random access memory 140 includes a flash translation layer (FTL) 142. The FTL 142 includes a management table 144, an overlap range table 150, and CUQ 160.

The device interface 170 is capable of receiving a read request 182 via the device 180 during a control sync operation. The read request 182 contains at least one read address value 184 that is associated with data stored in the non-volatile memory 104. In at least one implementation, the FTL 142 is configured to perform an address translation using the read address value 184 provided by the read request 182. In at least one implementation, the read address value 184 translates to a physical address associated with the data on the non-volatile memory 104. The memory interface 132 is configured to read data from the non-volatile memory 104 based on the read address value 184. In at least one implementation, the controller 130 returns the data from the non-volatile memory 104 to the host 180 via the memory interface 132 and the device interface 170.

The management table 144 contains physical addresses to the storage elements in the non-volatile memory 104. In at least one implementation, the management table 144 contains logical block addresses that are mapped or linked to physical block addresses of the storage elements in the non-volatile memory 104. In at least one implementation, the management table 144 maps the read address value 184 to a physical address in the non-volatile memory 104.

The overlap range table 150 lists and identifies at least one address value or characteristic that is located in the CUQ 160. In at least one implementation, the at least one address value or characteristic links to a storage element in the non-volatile memory 104. The storage element may be a physical or logical region of storage elements. Examples of physical regions of storage elements include blocks, sectors, or wordlines. Examples of logical regions of storage elements include logical block addresses. In at least one implementation, the overlap range table 150 lists a region of storage elements in which the address value is located in the CUQ 160. In at least one implementation, storage elements that need to be updated include recently accessed storage elements. For example, recently accessed may signify storage elements accessed since the last control sync operation. In at least one implementation, the overlap range table was previously updated to include the read address value 184. The at least one address value or characteristic may be a logical address. The at least one value or characteristic is advantageous to quickly identify one or more storage elements in the management table 144 that has not yet been updated.

The CUQ 160 stores control updates for the management table 144. The CUQ 160 is a side queue to the management table 144 in the FTL 142. In at least one implementation, the control updates for the management table 144 include logical-to-physical mappings to the non-volatile memory 104. In at least one implementation, the CUQ 160 contains a value or characteristic of an address, such as a logical block address, that matches a physical address of a storage element in the non-volatile memory 104. In at least one implementation, the CUQ 160 points to a physical address in the non-volatile memory 104 based on the read address value 184. In at least one implementation, the CUQ 160 is capable of performing the same set of functions as the management table 144 in the FTL 142. These functions may include logical block mapping, even-wear leveling, garbage collection, and write amplification.

The CUQ 160 is configured to act as a temporary or proxy management table during a control sync operation. The control sync operation may copy the management table 144 into the non-volatile memory 104, tying up the bandwidth of the management table 144. The control sync operation may also be triggered periodically if the management table 144 has not been updated in the non-volatile memory 104 for a predetermined period of time. In at least one implementation, the control sync operation is performed after a group of blocks are allocated for new incoming device data.

During the control sync operation, the CUQ 160 receives new control updates for the management table 144. Following the control sync operation, the controller 130 consolidates the control updates into the management table 144 by copying or reassigning control updates. The copying or reassigning of control updates includes mapping of physical addresses. In another implementation, the CUQ 160 updates all its values to the management table 144 automatically, in stages, or one value at a time over a period of time. In at least one implementation, the CUQ 160 includes address values and mappings according to a recent access in the non-volatile memory 104. The recent access may be requested by the device 180. In another implementation, the CUQ 160 automatically updates the management table 144 when a predetermined threshold is reached.

The CUQ 160 may be stored in various types of memory, including the non-volatile memory 104. The CUQ 160 may periodically be updated to a non-volatile memory 104. Likewise, the overlap range table 150 may periodically be updated to a non-volatile memory 104. In another implementation, the overlap range table 150 and the CUQ 160 may automatically be updated to the non-volatile memory 104 just prior to a non-blocking control sync.

Figure 2:
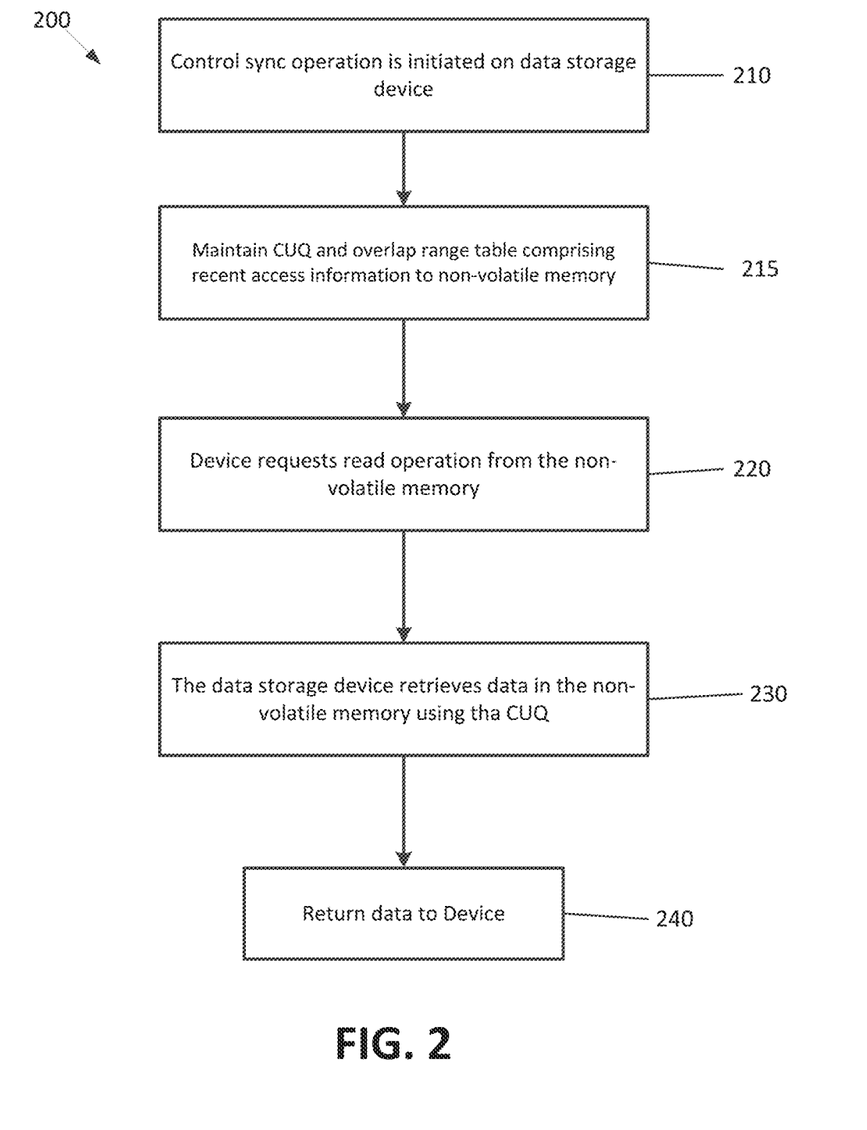
FIG. 2 illustrates a method of executing a read operation during a non-blocking control sync operation according to one implementation described herein.

FIG. 2 illustrates a method 200 of executing a read operation during a non-blocking control sync operation according to one implementation described herein. In step 210, the controller 130 initiates a control sync operation on the data storage device 102. In step 215, the controller 130 maintains a CUQ and an overlap range table comprising recent access information to the non-volatile memory 104. In step 220, the device 180 requests a read operation from the non-volatile memory 104. The read operation includes a read request 182 with a read address value 184. The controller 130 may direct the read request 182 to the CUQ 160 during the non-blocking control sync operation.

In step 230, the controller executes the read operation using the physical address provided by the CUQ 160 and retrieves the data from the non-volatile memory 104. In one implementation, the CUQ 160 acts as a proxy management table to the management table 144. This proxy (a.k.a. the CUQ 160) contains a mapping of address values to physical address locations in the non-volatile memory 104. In at least one implementation, the CUQ 160 holds the mapping of the read address value 184 to its physical address. If the address value of the read operation is not found in the CUQ 160, the controller 130 uses the management table 144 to provide the physical address. In step 240, the data corresponding to the read operation is returned to the device 180.

Without the implementations of method 200, read request 184 may be delayed because the management table 144 is occupied with a control sync operation. Implementations of method 200 optimize read latency during control sync operations because they employ a proxy management table, such as the CUQ 160. Method 200 implementations also ensure the most current flash translation layer mapping is used. That is, read operation errors might arise while using a management table 144 receiving control updates.

Figure 3:
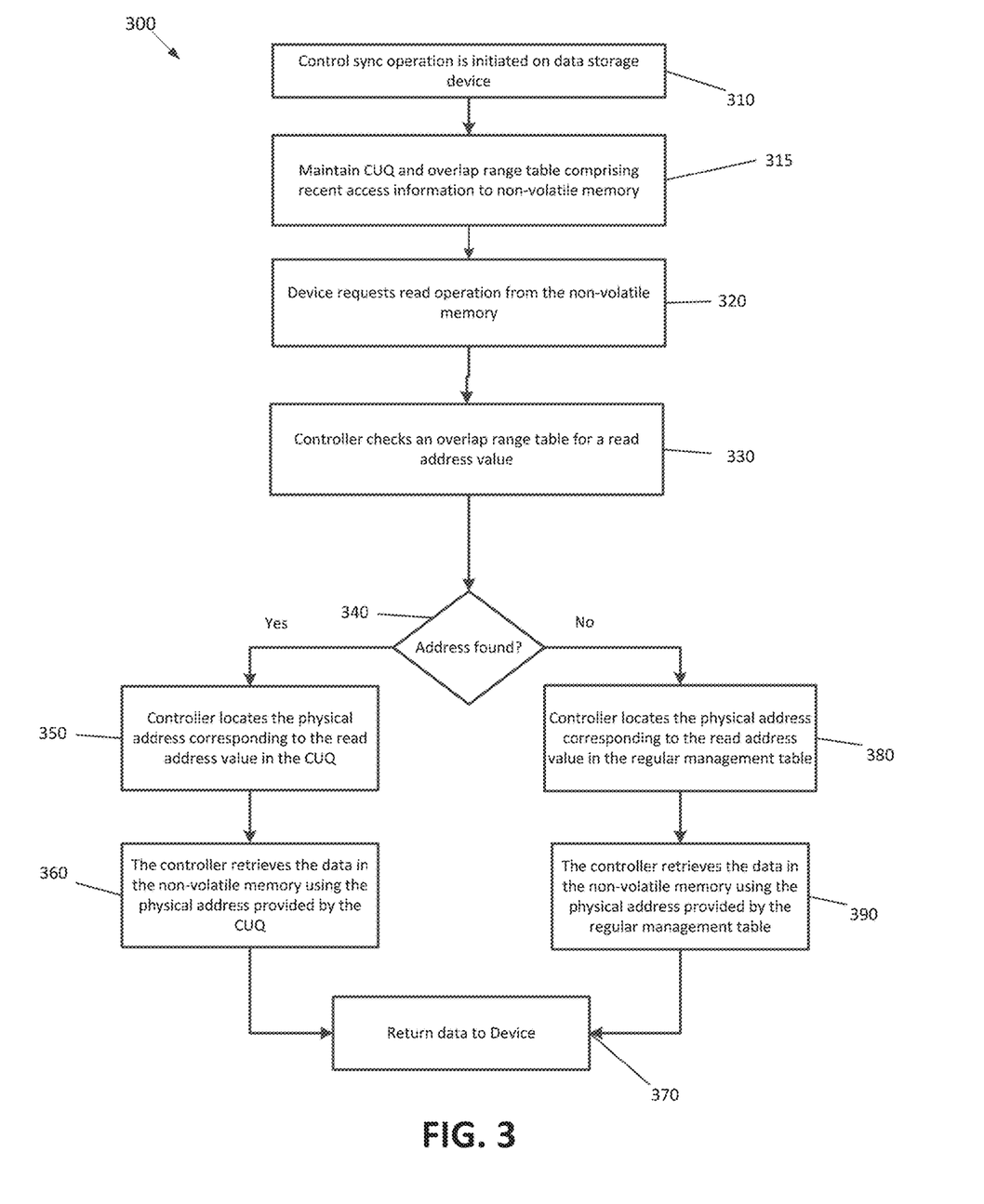
FIG. 3 illustrates another method of executing a read operation during a non-blocking control sync operation according to one implementation described herein.

FIG. 3 illustrates another method 300 of executing a read operation during a non-blocking control sync operation according to one implementation described herein. In step 310, the controller 130 initiates a control sync operation on the data storage device 102. In step 315, the controller 130 maintains a CUQ and an overlap range table comprising recent access information to the non-volatile memory 104. In step 320, the device 180 requests a read operation from the non-volatile memory 104. The read operation includes a read request 182 with a read address value 184. The controller 130 may direct the read request 182 to the CUQ 160 during the non-blocking control sync operation.

In step 330, the controller 130 checks an overlap range table 150. The overlap range table 150 comprises a list of address values that are in the CUQ. The overlap range table 150 may contain the read address value 184. In step 340, the controller 130 determines if the requested address value is found in the overlap range table 150. In step 350, if the read address value 184 is found in the overlap range table 150, the controller 130 locates the physical address corresponding to the read address value 184 in the CUQ 160.

In step 360, the controller 130 retrieves the data in the non-volatile memory 104 using the physical address provided by the CUQ 160. In step 370, the controller returns the data corresponding to the read request 182 to the device 180.

Alternatively, in at least one implementation, the controller 130 does not find the requested address value, such as the read address value 184, in the overlap range table 150. Then, in step 380, the controller 130 locates the physical address corresponding to the read address value 184 via the regular management table 144.

In step 390, the controller 130 retrieves the data in the non-volatile memory 104 using the physical address provided by the regular management table 144. In step 370, the controller returns the data corresponding to the read request 182 to the device 180.

Without the implementations of method 300, read request 182 may be delayed because the management table 144 is occupied with a control sync operation. Embodiments of method 300 optimize read latency during control sync operations because they employ an overlap range table 150. Instead of searching the CUQ 160 for every translation layer mapping, the controller 130 first looks to the overlap range table 150 to determine if the read address value 184 is listed. If the CUQ 160 is full or nearly full, lengthy searches are avoided by using the overlap range table 150. Thus, prolonged read latency for the correct mapping is optimized.

Figure 4:
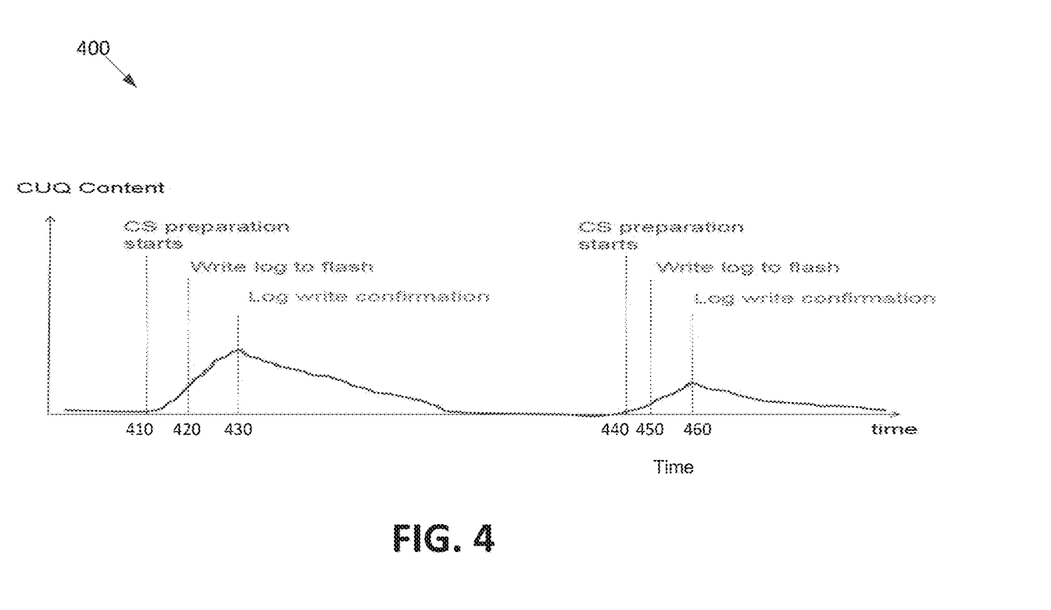
FIG. 4 illustrates a chart of the contents of the CUQ as a function of time during two control sync operations according to one implementation described herein.

FIG. 4 illustrates a chart of the contents of the CUQ as a function of time during two control sync operations according to one implementation described herein. The CUQ 160 evicts its control updates after the control sync operation is completed. The removal of the CUQ values may occur automatically, in stages, or one value at a time over a period of time. Evicting control updates maintains the accuracy of the management table 144 and new control updates. Evicting updates also increases performance by reducing the number of entries to search through.

At time 410, a control sync operation initiates, resulting in the accumulation of control updates in the CUQ 160. At time 420 or, for the second control sync operation at time 450, the management table 160 is written to the non-volatile memory 104. The CUQ 160 may continue to accumulate control updates during this period.

At time 430, the controller 130 receives an indication that the management table 160 is considered safe and stored to the non-volatile memory 104. Control updates begin to be evicted at this time. In at least one implementation, control updates may be evicted automatically once the indication of a successful control sync operation is received. In at least one alternative implementation, control updates may be evicted automatically prior to an additional control sync to the management table 144.

In at least one implementation, the control update eviction occurs progressively by placing at least one marker in the CUQ 160 to indicate a partial update to the management table 144 in the non-volatile memory 104. The marker indicates the entries that have not yet been evicted, and that the entries are a remainder from the previous control sync operation. For example, a control update entry entered at time 410 or time 420 may be marked to be removed after time 460 if it is not removed before time 440. Marked control updates are updated to the management table 160 during a subsequent control update operation.

Control update entries may enter the CUQ 160 during the eviction process between time 430 and time 440. In at least one implementation, at least one control update entry will be evicted for each new incoming control update entry. This gradual removal of control updates prevents the CUQ 160 from expanding during the eviction process.

Figure 5:
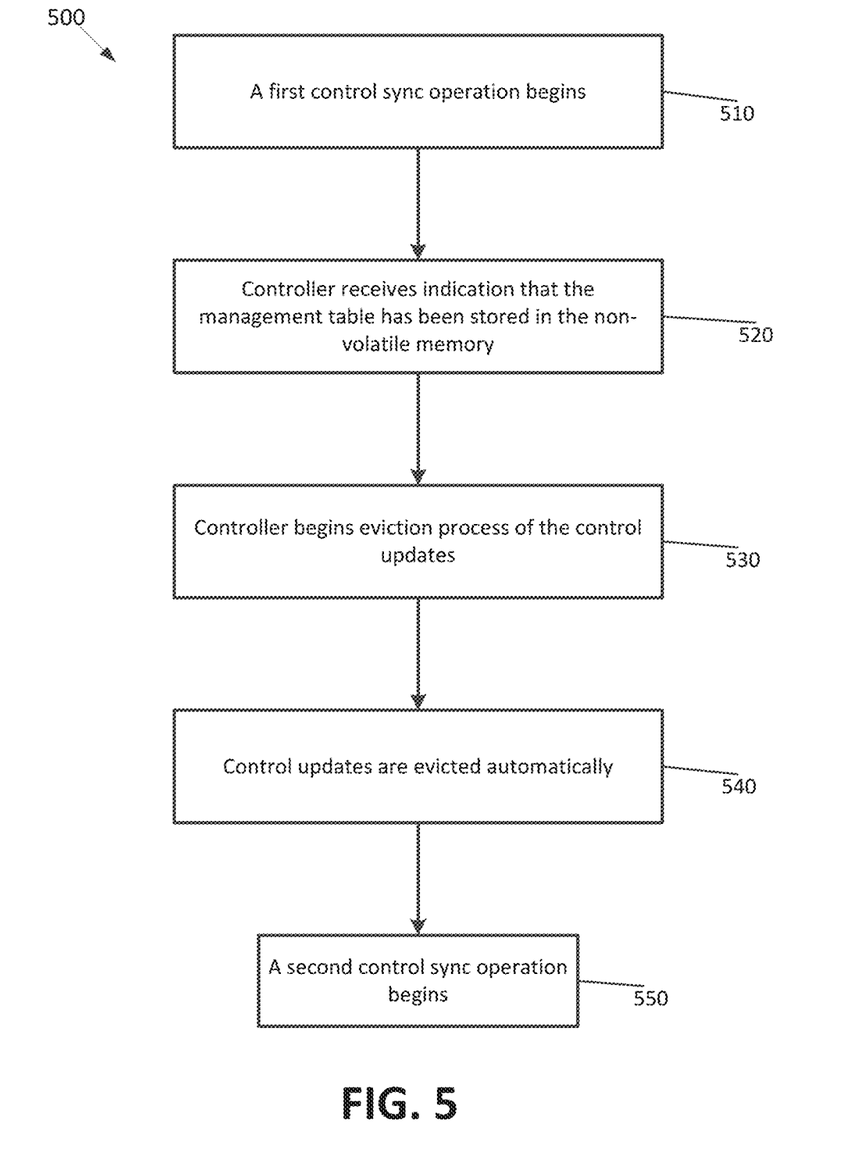
FIG. 5 illustrates a method for removing control updates from a CUQ according to one implementation described herein.

FIG. 5 illustrates a method 500 for removing control updates from a CUQ according to one implementation described herein. In step 510, a first control sync operation begins on a CUQ 160 containing at least one control update. In step 520, the controller 160 receives an indication that the management table 144 has been stored in the non-volatile memory 104. In step 530, the controller 130 begins the eviction process of the control updates in the CUQ 160. In step 540, the control updates in the CUQ 160 are evicted automatically. In at least one implementation, control updates may be evicted automatically once the indication of a successful control sync operation is received. In at least one alternative implementation, control updates may be evicted automatically prior to an additional control sync to the management table 144. In step 550, a second control sync operation is initiated.

Figure 6:
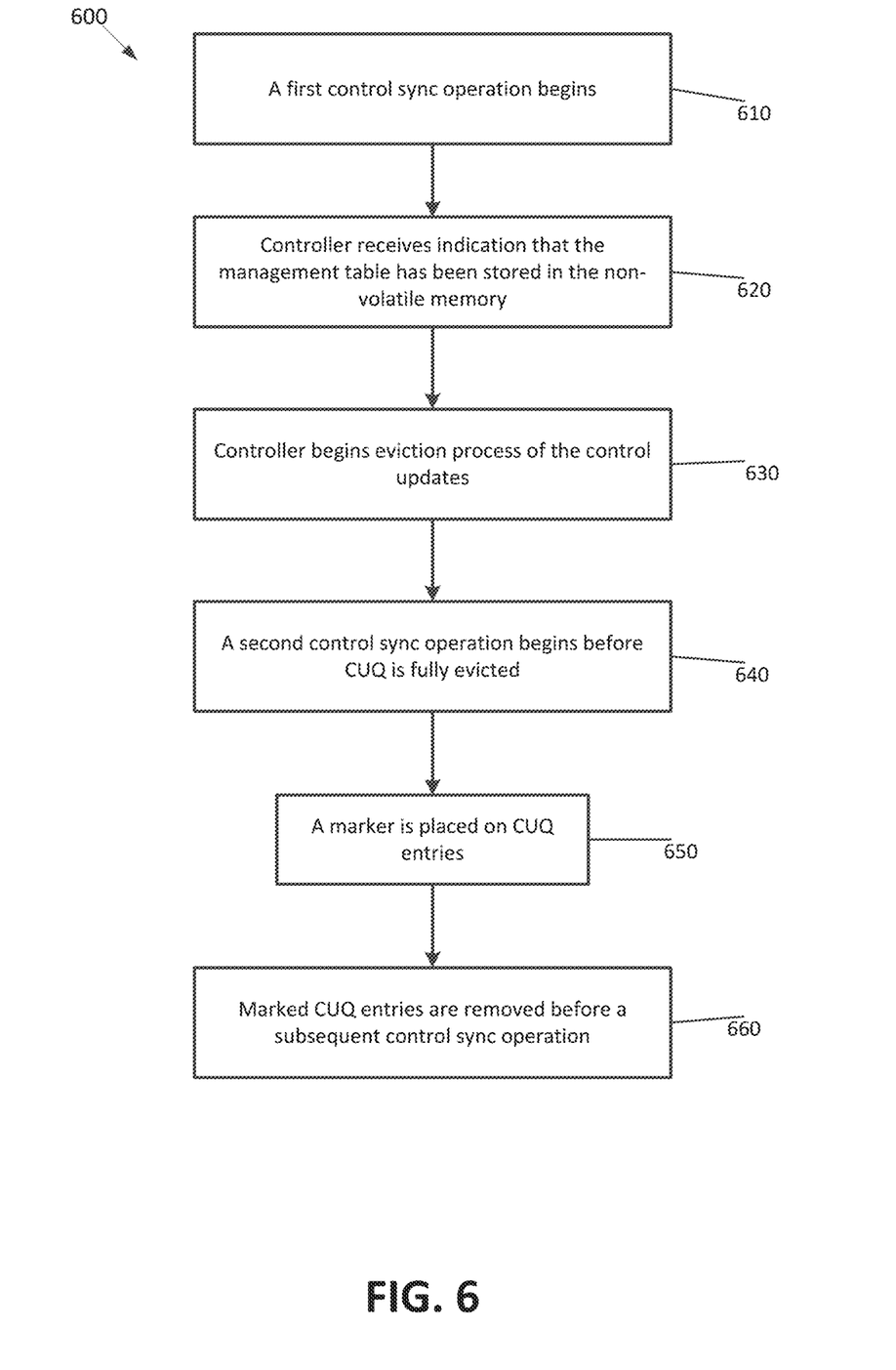
FIG. 6 illustrates another method for removing control updates from a CUQ according to one implementation described herein.

FIG. 6 illustrates another method 600 for removing control updates from a CUQ according to one implementation described herein. In step 610, a first control sync operation begins on a CUQ 160 containing at least one control update. In step 620, the controller 160 receives an indication that the management table 144 has been stored in the non-volatile memory 104. In step 630, the controller 130 begins the eviction process of the control updates in the CUQ 160. In step 640, a second control sync operation begins before the CUQ is fully evicted. That is, at least one control update remains in the CUQ when a second control sync operation is initiated. In step 650, a marker is placed on the at least one CUQ entry. The mark indicates that the at least one control update entry is to be removed during a subsequent control sync operation. In step 660, the marked at least one control update entry is removed before a subsequent control sync operation.

As disclosed herein, a method, in a controller including a flash translation layer (FTL) and one or more management tables coupled to a non-volatile memory, comprises: maintaining a CUQ and an overlap range table comprising recent access information to the non-volatile memory; receiving a read request during an update of the one or more management tables in non-volatile memory; and reading data from the non-volatile memory using the overlap range table and the CUQ during the update of the one or more management tables. The update of the one or more management tables in the non-volatile memory is part of a non-blocking control sync operation. The method further comprises evacuating the CUQ after a non-blocking control sync operation and after updating these entries in the one or more management tables. The method further comprises performing flash management functions. The flash management functions comprise logical to physical address mapping, even-wear leveling, garbage collection, and write amplification. The method further comprises identifying an address value of the read request in the overlap range table; and either: locating, in response to the identifying the address value of the read request in the overlap range table, a physical address of the read request in the CUQ; or in case where the address is not identified in the overlap range table, locating the physical address of the read request from other memory management tables. The CUQ includes a list of logical to physical mapping pairs, according to recent updates ordered chronologically by the FTL. The overlap range table includes a list of address values of recent accesses to the non-volatile memory allowing efficient LBA range searches. The overlap range table includes an indication flag that an entry exists in the CUQ and optionally further includes a pointer to the relevant CUQ entry.

Additionally, a system disclosed herein comprises: a non-volatile memory including an FTL and one or more management tables; and at least one processor coupled to a volatile memory configured to: maintain an overlap range table comprising recent access information to the non-volatile memory and CUQ; receive a read request during an update of the one or more management tables to the non-volatile memory; and read data from the non-volatile memory using the overlap range table and the CUQ during the update of the one or management tables by the FTL. At least one entity is further configured to identify an address value of the read request in an overlap range table, wherein the at least one entity tries to locate, in response to the identifying the address value of the read request in an overlap range table, a physical address of the read request in the CUQ; and in case where the address is not identified in the overlap range table or not found within the CUQ, locate the physical address of the read request from other memory management tables. The at least one entity comprises a processor or a hardware block. At least one entity is further configured to identify an address value of the read request in an overlap range table, wherein a different entity tries to locate, in response to the identifying the address value of the read request in an overlap range table, a physical address of the read request in the CUQ; and in case where the address is not identified in the overlap range table or not found within the CUQ, locate the physical address of the read request from other memory management tables. The at least one entity comprises a processor or a hardware block.

A non-transitory computer-readable medium is also disclosed that includes instructions, that, when executed by a processing unit of a system with a controller including a FTL and one or more management tables coupled to a non-volatile memory, cause the system to efficiently perform reads during an update to the management table by performing the steps of: maintain an overlap range table comprising recent access information to the non-volatile memory and CUQ; receive a read request by the FTL during an update of the one or more management tables during a non-blocking control sync; and read data from the non-volatile memory using a CUQ during the update of the one or management tables during the non-blocking control sync. The system further performs the steps of identifying an address value of the read request in an overlap range table; and either: trying to locate in response to the identifying the address value of the read request in an overlap range table, a physical address of the read request in the CUQ; or in case where the address is not identified in the overlap range table or the entry isn't found in the CUQ, locate the physical address of the read request from other memory management tables.

Additionally, a device, comprises: a non-volatile memory device; means for mapping physical addresses coupled to a non-volatile memory; means to receive a read request during an update of the means for mapping physical addresses during a non-blocking control sync; and means to read data from the non-volatile memory using a temporary means for mapping physical addresses during the update of the means for mapping physical addresses during the non-blocking control sync. The device also comprises means to identify a means for identifying physical addresses of the read request in an overlap range table; and either: means to locate, in response to the identifying the means for identifying physical addresses of the read request in an overlap range table, a physical address of the read request in the temporary means for mapping physical addresses; or in case where the address is not identified in the overlap range table or isn't found in the CUQ, means to locate the physical address of the read request from other memory management tables.

As disclosed herein, a method in a controller including a management table coupled to a non-volatile memory comprises: receiving a read request in the non-volatile memory during an update of the management table; and reading data from the non-volatile memory using a CUQ during the update of the management table. The method also comprises identifying an address value of the read request in an overlap range table; and locating, in response to the identifying the address value of the read request in an overlap range table, a physical address of the read request in the CUQ. In the method, the CUQ is capable of performing a set of functions performed by the management table. Furthermore, the set of functions includes logical block mapping, even-wear leveling, garbage collection, and write amplification. The CUQ includes a second address value according to a recent access in the non-volatile memory. The overlap range table includes the address value of the read request according to a recent access in the non-volatile memory. The overlap range table lists a storage element in which the address value is located. The storage element is a physical or logical region of storage elements. The CUQ is a side queue to the management table in a flash translation layer. The CUQ updates the management table when a predetermined threshold is reached. The CUQ has a copy stored in the non-volatile memory. The method further comprises removing an entry of the CUQ following a confirmation of the update of the management table. The removing the entry occurs automatically prior to a second update of the management table. The entry is marked for removal in a subsequent update of the management table. The marking of the entry indicates failure to remove prior to the update of the management table. At least the entry is removed from the CUQ upon receiving a new incoming entry.

As also disclosed herein, a system comprises a non-volatile memory including a management table; at least one processor configured to: receive a read request in the non-volatile memory during an update of the management table to the non-volatile memory; and read data from the non-volatile memory using a CUQ during the update of the management table. The system also includes a device memory coupled to the at least one processor. The at least one processor is further configured to identify an address value of the read request in an overlap range table; and locate, in response to the identifying the address value of the read request in an overlap range table, a physical address of the read request in the CUQ.

A non-transitory computer-readable medium including instructions, that, when executed by a processing unit of a system with a controller including a management table coupled to a non-volatile memory, cause the system to efficiently perform reads during an update to the management table by performing the steps of: receive a read request in the non-volatile memory during an update of the management table; and read data from the non-volatile memory using a CUQ during the update of the management table is also disclosed. The controller further causes identifying an address value of the read request in an overlap range table; and locating, in response to the identifying the address value of the read request in an overlap range table, a physical address of the read request in the CUQ.

As also disclosed herein a device comprises a non-volatile memory device; means for mapping physical addresses coupled to a non-volatile memory; means to receive a read request during an update of the means for mapping physical addresses; and means to read data from the non-volatile memory using a temporary means for mapping physical addresses during the update of the means for mapping physical addresses. The device also includes means to identify a means for identifying physical addresses of the read request in an overlap range table; and means to locate, in response to the identifying the means for identifying physical addresses of the read request in an overlap range table, a physical address of the read request in the temporary means for mapping physical addresses.

Implementations of the systems and methods optimize read latency during control sync operations because they employ a proxy management table, such as the CUQ 160. The overlap range table avoids prolonged searches of the proxy management table, directing read operations to the regular management table when necessary. Implementations of the systems and methods also ensure the most current flash translation layer mapping is used. That is, read operation errors might arise while using a management table 144 receiving control updates.

While the foregoing is directed to implementations of the present disclosure, other and further implementations of the disclosure may be devised without departing from the basic scope thereof, and the scope thereof is determined by the claims that follow.

What is claimed is:
1. A method, in a controller including a flash translation layer (FTL) and one or more management tables coupled to a non-volatile memory, comprising:
  maintaining a control update queue (CUQ) and an overlap range table comprising recent access information to the non-volatile memory;

receiving a read request and checking if an update of the one or more management tables in non-volatile memory is ongoing;

reading data from the non-volatile memory using the overlap range table and the CUQ if the update of the one or more management tables is ongoing; and evicting control updates in response to receiving an indication that the update of the one or more management tables has been stored in the non-volatile memory.

2. The method of claim 1, wherein the update of the one or more management tables in the non-volatile memory is part of a non-blocking control sync operation.

3. The method of claim 2, further comprising evacuating the CUQ after a non-blocking control sync operation and after updating these entries in the one or more management tables.

4. The method of claim 3, further comprising performing flash management functions.

5. The method of claim 4, wherein the flash management functions comprise logical to physical address mapping, even-wear leveling, garbage collection, and write amplification.

6. The method of claim 1, further comprising:
identifying an address value of the read request in the overlap range table; and either:
locating, in response to the identifying the address value of the read request in the overlap range table, a physical address of the read request in the CUQ; or
in case where the address is not identified in the overlap range table, locating the physical address of the read request from other memory management tables.

7. The method of claim 6, wherein the CUQ includes a list of logical to physical mapping pairs, according to recent updates ordered chronologically by the FTL.

8. The method of claim 6, wherein the overlap range table includes a list of address values of recent accesses to the non-volatile memory allowing efficient LBA range searches.

9. The method of claim 6, wherein the overlap range table includes an indication flag that an entry exists in the CUQ and optionally further includes a pointer to the relevant CUQ entry.

10. The method of claim 1, wherein while the controller writes one or more management tables to flash, the tables are not updated.

11. The method of claim 10, further comprising sending the read data to a host device.

12. A system, comprising:
a non-volatile memory;
an FTL;
one or more management tables; and
at least one controller coupled to the non-volatile memory, the at least one controller configured to check an overlap range table for a read address value and evict control updates in response to receiving an indication that an update of the one or more management tables has been stored in the non-volatile memory.

13. The system of claim 12, wherein the at least one controller is configured to read data from the non-volatile memory using the overlap range table and a CUQ while one or more management tables are updated.

14. The system of claim 13, wherein the at least one controller is configured to check the overlap range table for a read address value in response to receiving a read request.

15. The system of claim 14, wherein the at least one controller locates a physical address corresponding to the read address value and wherein the physical address value is in the CUQ in response to logical address is found in overlap table.

16. The system of claim 15, wherein the at least one controller retrieves the data using the physical address from the CUQ.

17. The system of claim 16, wherein the at least one controller is configured to return the data to a host device.

18. The system of claim 12, wherein the at least one controller is further configured to identify an address value of a read request in the overlap range table, wherein the at least one controller tries to locate, in response to identifying the address value of the read request in an overlap range table, a physical address of the read request in a CUQ; and in case where the address is not identified in the overlap range table or not found within the CUQ, locate the physical address of the read request from other memory management tables.

19. A system, comprising:
a non-volatile memory;
an FTL;
one or more management tables;
means to receive an indication that an update of the one or more management tables has been stored in the non-volatile memory; and
means to evict control updates in response to receiving the indication.

20. The system of claim 19, further comprising means to automatically evict the control updates.

21. The system of claim 20, further comprising means to initiate a control sync operation.

22. A device, comprising:
a controller configured to:
identify an address value of a read request in an overlap range table; and either:
locate, in response to the identifying the address value of the read request in the overlap range table, a physical address of the read request in a CUQ; or
in case where the address is not identified in the overlap range table, locate the physical address of the read request from other memory management tables; and
evict control updates in response to receiving an indication that an update of one or more management tables has been stored in non-volatile memory.

23. The device of claim 22, wherein the controller is further configured to initiate a control sync operation.

24. The device of claim 23, wherein the controller is further configured to write mapping tables to non-volatile memory during the control sync operation.

25. The device of claim 23, wherein the controller is configured to not update the management tables during the control sync operation.

26. The device of claim 23, wherein the control sync operation is done in a non-blocking manner, so that new host write operations are being processed, and new updates to the management table need to be stored.

27. The device of claim 23, wherein new updates to the management table during the control sync operation are stored in the CUQ, and a matching entry is also added to the overlap range table.

28. The device of claim 22, wherein the controller is further configured to evict data from the CUQ after a control sync operation.

29. The device of claim 22, wherein the controller is further configured to retrieve data of the read request from non-volatile memory using the physical address located in the CUQ.

30. A device, comprising:
- a non-volatile memory device;
- means for mapping physical addresses;
- means to receive a read request during an update of the means for mapping physical addresses during a non-blocking control sync;
- means to read data from the non-volatile memory using a temporary means for mapping physical addresses during the update of the means for mapping physical addresses during the non-blocking control sync; and
- means to evict control updates in response to receiving an indication that an update of one or more management tables has been stored in the non-volatile memory device.

31. The device of claim 30, further comprising:

means to identify a means for identifying physical addresses of the read request in an overlap range table; and either:
- means to locate, in response to the identifying the means for identifying physical addresses of the read request in an overlap range table, a physical address of the read request in the temporary means for mapping physical addresses; or
- in case where the means for identifying physical address of the read request is not identified in the overlap range table or isn't found in the temporary means for mapping physical addresses, means to locate the physical address of the read request from other memory management tables.

* * * * *